United States Patent
Millar et al.

(10) Patent No.: US 10,585,188 B2
(45) Date of Patent: Mar. 10, 2020

(54) BROADSIDE DETECTION SYSTEM AND TECHNIQUES FOR USE IN A VEHICULAR RADAR

(71) Applicant: Valeo Radar Systems, Inc., Hudson, NH (US)

(72) Inventors: Jeffrey Millar, Mont Vernon, NH (US); Wilson J. Wimmer, Hudson, NH (US); Akram Ahmadi, Bedford, MA (US); David Insana, Manchester, NH (US)

(73) Assignee: Valeo Radar Systems, Inc., Hudson, NH (US)

( * ) Notice: Subject to any disclaimer, the term of this patent is extended or adjusted under 35 U.S.C. 154(b) by 333 days.

(21) Appl. No.: 15/662,774

(22) Filed: Jul. 28, 2017

(65) Prior Publication Data
US 2019/0033442 A1    Jan. 31, 2019

(51) Int. Cl.
*G01S 13/93*       (2020.01)
*G01S 7/41*        (2006.01)
(Continued)

(52) U.S. Cl.
CPC .......... *G01S 13/931* (2013.01); *B60Q 1/0023* (2013.01); *G01S 7/2921* (2013.01);
(Continued)

(58) Field of Classification Search
CPC ...... G01S 13/931; G01S 13/87; G01S 13/582; G01S 13/524; G01S 7/415; G01S 7/2921;
(Continued)

(56) References Cited

U.S. PATENT DOCUMENTS

| 7,463,182 | B1 | 12/2008 | Morinaga et al. |
| 2010/0238066 | A1* | 9/2010 | Lohmeier ................. G01S 7/10 342/70 |

(Continued)

FOREIGN PATENT DOCUMENTS

JP     2016211992 A    12/2016

OTHER PUBLICATIONS

PCT International Search Report dated Oct. 1, 2018, for Application No. PCT/US2018/042428; 16 Pages.
(Continued)

*Primary Examiner* — Frank J McGue
(74) *Attorney, Agent, or Firm* — Daly, Crowley, Mofford & Durkee, LLP

(57) ABSTRACT

A method and apparatus for detecting static objects and broadside objects in a vehicular radar system is presented. Detection data within a field of view for a host vehicle is acquired. A histogram process is used to determine a presence of at least one of a static object and a broadside vehicle. The histogram process includes generating ratios of a relative velocity of an object (Vr) to host velocity (Vh) from acquired detection data and determining a number of detections which occur at an angle α corresponding to an intersection of two lines with a first line represented by Vr/Vh=0 and a region of a second line within the FOV along which Vr/Vh≠0. The detections are filtered to identify only those detection points at a first and second predetermined values of α, wherein the identified detections indicate a presence of a static object and/or a broadside vehicle.

28 Claims, 14 Drawing Sheets

(51) Int. Cl.
- *G01S 13/58* (2006.01)
- *G01S 13/524* (2006.01)
- *G01S 7/292* (2006.01)
- *B60Q 1/00* (2006.01)
- *G01S 13/18* (2006.01)
- *G01S 13/87* (2006.01)
- *H01Q 1/32* (2006.01)
- *G01S 13/931* (2020.01)

(52) U.S. Cl.
CPC .............. *G01S 7/415* (2013.01); *G01S 13/18* (2013.01); *G01S 13/524* (2013.01); *G01S 13/582* (2013.01); *G01S 13/87* (2013.01); *H01Q 1/3233* (2013.01); *H01Q 1/3283* (2013.01); *G01S 2013/9314* (2013.01); *G01S 2013/9317* (2013.01); *G01S 2013/9325* (2013.01); *G01S 2013/9332* (2013.01); *G01S 2013/9353* (2013.01); *G01S 2013/9385* (2013.01)

(58) Field of Classification Search
CPC .............. G01S 13/18; G01S 2013/9325; G01S 2013/9332; G01S 2013/9353; G01S 2013/9385; G01S 2013/9317; G01S 2013/9314; H01Q 1/3283; H01Q 1/3233; B60Q 1/0023
USPC ............................................................ 342/70
See application file for complete search history.

(56) References Cited

U.S. PATENT DOCUMENTS

| | | |
|---|---|---|
| 2014/0111369 A1 | 4/2014 | Oh et al. |
| 2015/0070207 A1* | 3/2015 | Millar ................. G01S 13/006 342/174 |
| 2016/0171893 A1 | 6/2016 | Chen et al. |
| 2016/0178742 A1* | 6/2016 | Shikatani ............. G01S 13/60 342/113 |

OTHER PUBLICATIONS

PCT Written Opinion of the International Searching Authority dated Oct. 1, 2018, for Application No. PCT/US2018/042428; 10 Pages.

\* cited by examiner

BROADSIDE DETECTION SYSTEM AND TECHNIQUES FOR USE IN A VEHICULAR RADAR

BACKGROUND

As is known in the art, radar sensors for motor vehicles (vehicular radar sensors) are generally used for detecting target objects in the surroundings of a "host vehicle" (i.e. a vehicle in which the radar sensor is disposed) and may assist the driver in many aspects of operating the motor vehicle. To detect target objects, a radar sensor transmits radio frequency (RF) signals (electromagnetic waves) which impinge upon and may be reflected from one or more target objects. The radar sensor receives at least portions of the so-reflected signals (sometimes referred to as "echo signals"). From such received signals, a collection of detection points is acquired and processed to identify, and determine information relating to, one or more target objects.

Radar sensors may, for example, determine both speed of a target object relative to the host vehicle as well as a so-called "target angle," i.e. an angle between an imaginary connecting line the target object and a reference line. The reference line may, for example, correspond to a longitudinal axis of the host vehicle. Using a radar sensor, it is therefore possible to determine a current position of the target object relative to the host vehicle. It is also possible to track a target object located in a sensing region of the radar sensor i.e. the relative position of the target object can be determined continuously over a multiplicity of measurement cycles of the radar sensor.

As is also known, detection of broadside or "hovering" vehicles (that is vehicles traveling substantially adjacent to the host vehicle and at approximately a same speed as the host vehicle) as well as detection of static objects (i.e. non-moving objects) present certain difficulties for conventional radar sensors which results in a radar sensor providing an undesirable number of false alerts or late alerts for such objects.

SUMMARY

In accordance with the concepts, systems and techniques described herein, it has been recognized that a radar sensor having a wide field of view (FOV) may result in the radar sensor having poor angle measurements as well as poor Doppler measurements in some situations and that such characteristics may, at least in part, cause the radar sensor to generate an undesirable number of false alerts or late alerts in the detection of broadside (or hovering) vehicles (i.e. vehicles traveling substantially adjacent to a host vehicle and at approximately a same speed as the host vehicle) and/or in the detection of static objects (i.e. non-moving objects including, but not limited to, guardrails, curbs, fences, bushes, trees, sound barriers, temporary barriers or combinations thereof).

Accordingly, it has been recognized that there is a need for detection systems and techniques that will reduce, or ideally eliminate, false and/or late alerts in the detection of broadside vehicles and static objects.

Embodiments of the presently described broadside detection system and techniques for use in a vehicular radar disclosed here uses an analysis of detections to have a better estimation on hovering vehicles and guardrails. A method is being applied in a narrower FOV (e.g. in one embodiment, about 45 degrees to about 135 degrees) such that a linear approximation for a cosine function can be used (e.g. represented by a straight line), as discussed in detail hereinbelow. In a particular embodiment the FOV is less than or equal to about ninety degrees.

The ability to detect and distinguish between vehicles hovering at broadside and static infrastructure can be used to aid the driver with respect to collision avoidance as well as speed and spacing control in traffic.

In embodiments, a method for detecting static objects and hovering broadside objects (or more simply "hovering objects" or "broadside objects") using a vehicular radar system includes acquiring detection data within a field of view for a host vehicle. The method also includes using a histogram process to determine a presence of at least one of a static infrastructure object and a broadside vehicle. In embodiments, the histogram process includes generating ratios of Vr to Vh (Vr/Vh) where Vr is a relative velocity of an object and Vh is a host velocity from acquired detection data and determining a number of detections which occur at an angle $\alpha$ where the angle $\alpha$ corresponds to an intersection of two lines with a first line represented by Vr/Vh=0 and a region of a second line within the FOV along which Vr/Vh$\neq$0. The histogram process further includes filtering the detections to identify only those detection points at a first predetermined value of $\alpha$ and at a second predetermined value of $\alpha$. The identified detections at the first predetermined value of $\alpha$ indicate a presence of a static object, and the identified detections at the second predetermined value of $\alpha$ indicate a presence of a broadside vehicle.

In another embodiment, an apparatus for detecting static infrastructure objects and broadside objects in a vehicular radar includes a transmitter configured to transmit sets of radar pulses. The apparatus also includes a receiver for receiving sets of return pulses from an object. The apparatus additionally includes a processor to receive from the receiver a set of range and angle detection data relating to the return pulses. The apparatus additionally includes a processor to receive from the receiver a set of range and angle detection data relating to the return pulses. The processor uses a histogram process to determine a presence of at least one of a static object and a broadside vehicle. One embodiment the histogram process includes generating ratios of Vr to Vh from acquired detection data and determining a number of detections which occur at an angle $\alpha$ where the angle $\alpha$ corresponds to an intersection of two lines with a first line represented by Vr/Vh=0 and a region of a second line within the FOV along which Vr/Vh$\neq$0. The histogram process further includes filtering the detections to identify only those detection points at a first predetermined value of $\alpha$ and at a second predetermined value of $\alpha$. The identified detections at the first predetermined value of $\alpha$ indicate a presence of a static object, and the identified detections at the second predetermined value of $\alpha$ indicate a presence of a broadside vehicle.

In another embodiment, a computer program product including a non-transitory computer readable storage medium having computer program code encoded thereon that when executed on a processor of a computer causes the computer to operate a vehicular radar detection system, the computer program product comprises computer program code for detecting static infrastructure objects and broadside objects in a vehicular radar. The computer program product includes program code for using a histogram process to determine a presence of at least one of a static infrastructure object and a broadside vehicle. The computer program code for the histogram process includes computer program code generating ratios of Vr to Vh from acquired detection data and determining a number of detections which occur at an angle α where the angle α corresponds to an intersection of two lines with a first line represented by Vr/Vh=0 and a region of a second line within the FOV along which Vr/Vh≠0. The histogram process further computer program code for filtering the detections to identify only those detection points at a first predetermined value of α and at a second predetermined value of α. The identified detections at the first predetermined value of α indicate a presence of a static object, and the identified detections at the second predetermined value of α indicate a presence of a broadside vehicle.

In another particular embodiment, a method for detecting static infrastructure or static objects and hovering broadside objects using a vehicular radar system includes acquiring detection data within a field of view for a host vehicle. The method also includes plotting the detections in a two-dimensional (2D) plot of Vr/Vh versus Angle of Arrival (AoA) graph The method further includes producing a histogram of angle α (where angle α=180/π×a tan {Vr/Vh}/(AoA−π/2)) and represents the linear portion of Vr with respect to Vh in the area between the 45 degree AoA and the 135 degree AoA with respect to the host vehicle. Additionally, the method includes updating the histogram with a filter to produce a filtered histogram and determining locations of at least one peak in the filtered histogram, wherein a peak at a particular location in the filtered histogram indicates a presence of at least one of a static infrastructure object and a hovering broadside vehicle. The method may also include providing a notification upon detecting at least one of a static infrastructure object and a hovering broadside vehicle.

In another embodiment, an apparatus for detecting static infrastructure objects and broadside objects in a vehicular radar includes a transmitter configured to transmit sets of radar pulses. The apparatus also includes a receiver for receiving sets of return pulses from an object. The apparatus additionally includes a processor to receive from the receiver a set of range and angle detection data relating to the return pulses. The processor provides plot detection data in a two-dimensional (2D) plot of Vr/Vh versus AoA clutter image. The processor also produces a histogram of angle α from a line Vr/Vh=zero from the 2D plot, updates the histogram with a filter to produce a filtered histogram and determines locations of at least one peak in said filtered histogram, wherein a peak at a particular location in the filtered histogram indicates a presence of at least one of a static infrastructure object and a broadside vehicle.

In another embodiment, a computer program product including a non-transitory computer readable storage medium having computer program code encoded thereon that when executed on a processor of a computer causes the computer to operate a vehicular radar detection system, the computer program product comprises computer program code for detecting static infrastructure objects and broadside objects in a vehicular radar. The computer program product includes program code for acquiring detection data within a field of view (FOV) for a host vehicle using a vehicular radar system. The computer program product includes program code for plotting the detections in a two-dimensional (2D) plot of Vr/Vh versus AoA image. The computer program product further includes program code for producing a histogram of angle α from a line Vr/Vh=zero from the 2D plot. Additionally, the computer program product includes program code for updating the histogram with a filter to produce a filtered histogram and determining locations of at least one peak in the filtered histogram, wherein a peak at a particular location in the filtered histogram indicates a presence of at least one of a static infrastructure object and a broadside vehicle. The computer program product may also include program code for providing a notification upon detecting at least one of a static infrastructure object and a broadside vehicle.

BRIEF DESCRIPTION OF THE DRAWINGS

The foregoing features may be more fully understood from the following description of the drawings in which.

Figure 1A:
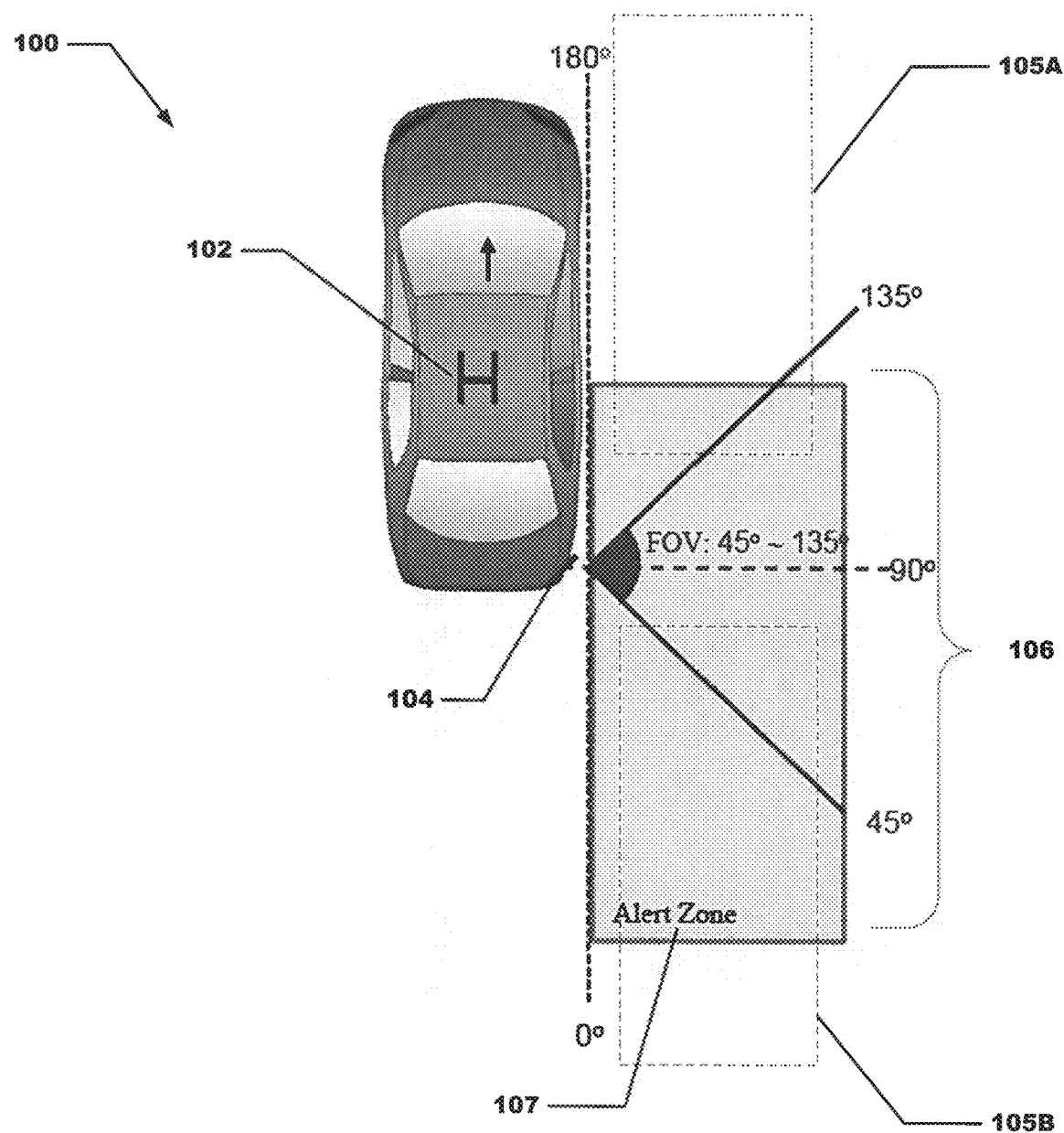
FIG. 1A is a diagram illustrating a vehicle radar sensing scenario in accordance with illustrative embodiments.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some terms are explained. The term "static infrastructure" or "static objects" may be used to refer to any non-moving object including, but not limited to, guardrails, curbs, fences, bushes, trees, sound barriers, temporary barriers or combinations thereof. The term "histogram" may refer to a collected data grouped into ranges. To promote clarity and understanding in the written description of the concepts described herein, such grouping of data may sometimes be represented herein as a graph or plot (e.g. the data is plotted as bar graphs or as a histogram plot). The term "IIR" may refer to an Infinite Impulse Response (IIR) digital filter. A "host vehicle" refers to a vehicle on which a radar sensor is disposed. A "broadside hovering object" (or more simply a "broadside object" or a "hovering object") refers to an object physically located substantially adjacent to at least a portion of a host vehicle and moving at substantially a same speed and direction as the host vehicle. When the object is a vehicle, the phrase "broadside hovering vehicle" or "broadside vehicle" or "hovering vehicle") may be used.

Embodiments of the presently described method and apparatus for detecting static objects and hovering broadside vehicles (or any hovering object) using a vehicular radar system relate to a method and apparatus for outputting a notification signal used to warn or otherwise alert the driver of a host vehicle about the presence of a broadside vehicle and/or static infrastructure. Embodiments of the presently described method and apparatus are directed particularly at a broadside vehicle and/or a static infrastructure identification system. Such a system and method may be used to notify the driver about the presence of a broadside vehicle or a static infrastructure object.

Embodiments of the presently described method and apparatus for detecting static infrastructure and hovering broadside vehicles using a vehicular radar sensor employ a proximity-based technique. Energy at a close range and coming from static infrastructure objects such as curbs, guardrails, bushes, trees or an object traveling alongside the host vehicle at or around a same speed are detected. In one embodiment, the system detects targets that substantially fill a field of view of the radar sensor, having a lateral offset (i.e., a broadside distance as measured from a host vehicle of between 1 meters and 20 meters.

In some embodiments, targets typically have a length of 6 meters to 20 meters. Some of the targets may be leading the field of view, some of the targets may be trailing the field of view, and some of the targets may fill or substantially fill the field of view.

Embodiments of the presently described method and apparatus for detecting to static infrastructure and hovering broadside vehicles using a vehicular radar sensor demonstrate a detection technique such that a driver of a host vehicle can be alerted about the presence of the broadside vehicle and/or a static object in a region broadside the host vehicle.

Embodiments of the presently described method and apparatus for detecting static infrastructure and hovering broadside vehicles using a vehicular radar sensor achieve this by way of a method, by way of a radar sensor, and by way of computer software according to the respective independent patent claims. Advantageous embodiments of the concepts described herein are the subject matter of the dependent patent claims, the description and the figures.

Further features of the concepts, systems gad techniques will emerge from the claims, the figures and the description of the figures. All the features and combinations of features that are cited in the description above and also the features and combinations of features that are cited in the description of the figures below and/or shown in the figures alone can be used not only in the respectively indicated 2s combination but also in other combinations or else on their own.

The concepts, systems and techniques will now be explained in more detail using an illustrative embodiment and with reference to the appended drawings. The host vehicle is moving, while static objects are not moving. Thus, static objects to the front of the host vehicle are generally approaching, while static objects to the rear of the host vehicle are generally receding.

On the other hand, for a moving object i.e., an object which has a velocity (i.e., a speed and direction) several possibilities exist depending upon the velocity of the moving object. For example, for a vehicle that is hovering broadside the host vehicle, the vehicle may be traveling at approximately the same speed as the host vehicle.

There are two different characteristics associated with static and moving objects. Static objects are objects that substantially fill the field of view of a radar sensor and have a speed versus angle relationship with respect to the host vehicle. Moving objects are objects that fill the radar sensor field of view and have approximately the same speed as the host vehicle at all angles.

In conventional vehicular radar sensors, a radar sensor is used to sense a relatively wide azimuthal angle range, which may be 150 degrees, in the horizontal direction. The radar sensor thus has a relatively large azimuthal sensing angle, which means that the field of view or sensing region of the radar sensor is of corresponding width in the azimuthal direction. The azimuthal sensing angle is normally symmetrical with respect to a radar sensor axis running perpendicular to a front face of the radar sensor, which means that the azimuthal sensing angle is measured from −75 degrees to +75 degrees, in relation to the radar sensor axis.

In some embodiments, a radar sensor is used to sense a narrower azimuthal angle range of about ninety degrees thereby providing an azimuthal sensing angle of about 45 degrees to about 135 degrees (total of 90 degrees), as opposed to conventional radar sensing system which typically use a field of view of about −75 degrees to about +75 degrees (total of about 150 degrees), in relation to the radar axis. The radar sensor detects objects (both static and moving objects) that may substantially fill the entire field of view or only fill a portion of the field of view.

Referring to FIG. 1A, an environment 100 for providing broadside detection is shown. Environment 100 includes a host vehicle 102 equipped with one or more radar sensors with a single radar sensor 104 being shown here for clarity. Radar sensor 104 includes a broadside detection system which operates in accordance with the concepts and techniques described herein. Sensors can be mounted on the host vehicle at various angles. In this embodiment, to be independent of the sensor's mounting angle, the coordinate system for referencing angles of arrivals and field of view is as shown in FIG. 1A.

To detect the target object, the radar sensor 104 transmits a radio frequency (RF) signal (electromagnetic waves) that is then reflected from one or more target objects. The radar sensor 104 receives portions of the reflected signals as a radar echo signals.

From this, a collection of detection points is acquired and processed to provide information relating to the target object with respect to the host vehicle.

In embodiments, the radar sensor 104 has a field of view 106 of about ninety (90) degrees, measured here at +45 degrees to +135 degrees. In embodiments, an object positioned within the radar sensor FOV between an angle of +45 degrees to +135 degrees (i.e. region 106) with respect to the host vehicle may be considered a broadside object, though other embodiments could employ a different sized field of view and different angles. In the example embodiment of FIG. 1A, vehicles 105a, 105b are generally within a sensor zone (or alert zone) 107 and when positioned as shown within FOV 106 and moving in substantially the same direction and at substantially same speed as host vehicle 102, vehicles 105a, 105b are also hovering vehicles. In a particular embodiment the FOV is less than or equal to about ninety degrees.

The radar sensor 104 can detect objects that substantially or completely fill the field of view, objects that may be approaching the host vehicle and only fill a portion of the field of view or objects that are receding and only fill a portion of the field of view. The sensor determines a group of detection points for objects. Also determined are angle α for each detection point.

In embodiments, the radar sensor of the host vehicle provides hundreds of detection points per second. Each detection point has a relative velocity and an angle α associated therewith, wherein angle α may be computed as:

$$\alpha = 180/\pi \times a\tan\{(Vr/Vh)/(AoA-\pi/2)\}$$

Figure 1B:
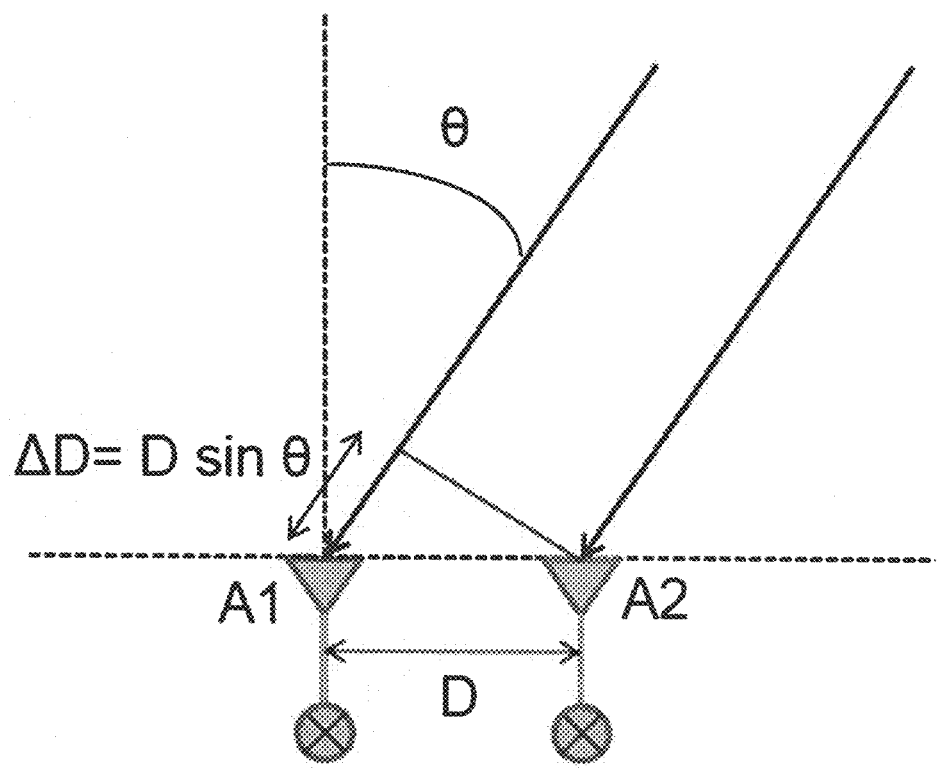
FIG. 1B is a graph illustrating a vehicle radar sensing scenario in accordance with illustrative embodiments.

The collected data by radar may include information that allows angle of arrival to be estimated. For example, in a radar technique called Monopulse AoA it estimates the angle of arrival of a signal using the phase difference of received energy at two separate receive antennas A1 and A2 as shown graph 150 of FIG. 1B. Since the received antennas are at different locations, the signal travels an extra distance of $\Delta D=D \sin(\theta)$ to reach antenna A1 than to reach antenna A2. This phase difference may be measured and used to calculate the angle of arrival θ of the corresponding signal.

In a vehicle radar scenario, the angle of arrival may be defined as an angle between 0 and 180 degrees, with zero degrees corresponding to the reverse direction of the vehicle and 180 degrees corresponding to the forward direction of the vehicle, as shown in FIG. 1A.

Figure 2:
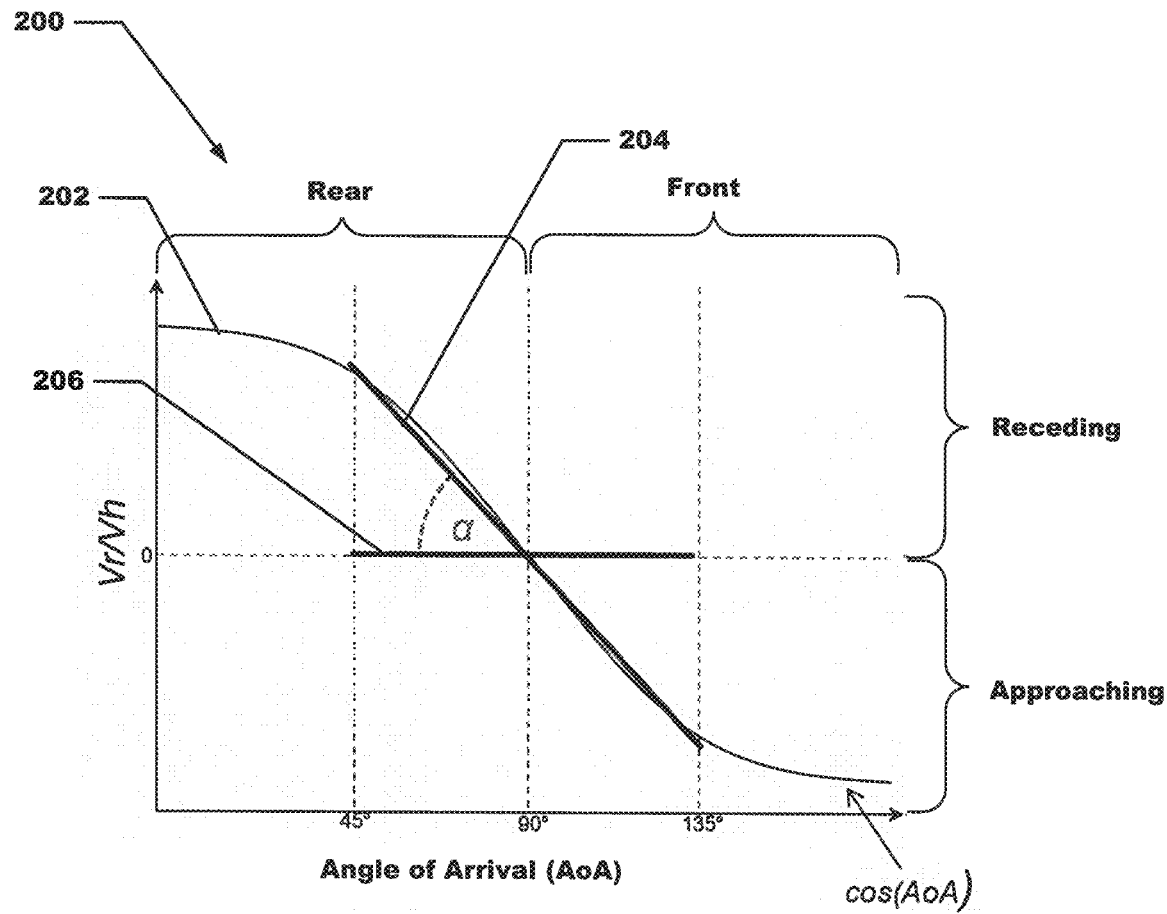
FIG. 2 is a graph showing an angle of arrival versus a ratio of relative velocity to host velocity in accordance with illustrative embodiments.

Using this definition of AoA, FIG. 2 shows a graph 200 having a horizontal axis corresponding to an AoA of a target object (either a static or moving object) and a vertical axis corresponding to a ratio of Vr of the object to Vh.

When a stationary object is in front of the moving host vehicle on the side the road (meaning an AoA of greater than 90 degrees), for example, the object will appear to be approaching toward the host vehicle, so the normalized Doppler Vr/Vh will be negative (with the direction away from the sensor being defined as the positive direction). When a stationary object is behind the moving vehicle on the side of the road (meaning an AoA of less than 90 degrees), the object will appear to be receding from the host vehicle. Thus, the normalized Doppler Vr/Vh will be positive.

When plotting Vr/Vh vs. AoA, static objects tends to fall on a cosine function that is Vr/Vh=cosine (AoA). This cosine function can be approximated by a straight line at angle α from line Vr/Vh=0 (as shown in FIG. 2, curve 204). Curve 202 represents detection values from a stationary infrastructure object within a radar sensor field of view (i.e. curve 202 is the cosine function of the AoA). Line 204 represents the linear approximation of curve 202 within a FOV of about 45 degrees to 135 degrees. Significantly, as can be seen from FIG. 2, curve 202 falls substantially on curve 204 within angles of arrival between 45 and 135 degrees.

Hovering objects, on the other hand, fall on or near the line Vr/Vh=0 since host and hovering vehicles are both moving at approximately the same velocity for a given time period (i.e Vr is small and ideally is about zero).

Line 206 represents ideal detection values of a hovering broadside object within a radar sensor field of view. Angle α 208 represents a distinguishing characteristic between static infrastructure objects (indicated by line 204) or hovering broadside objects (indicated by line 206).

The detections collected by the radar sensor results in clouds of detection points on the graph, depicted by either line 204 or line 206 depending on the object.

Figure 3:
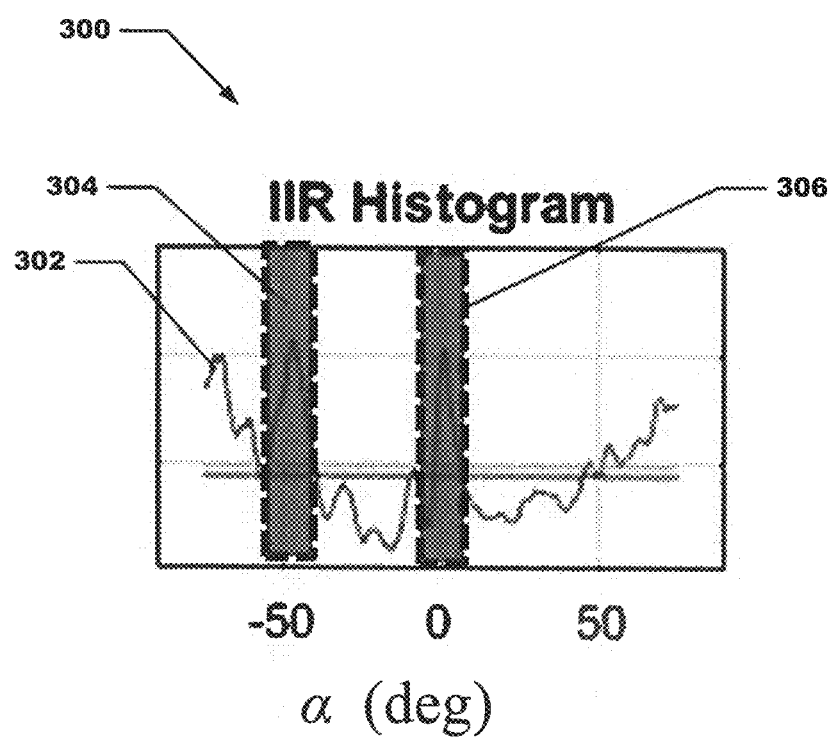
FIG. 3 is a histogram showing groups of detection points for a broadside vehicle and a static infrastructure object in accordance with illustrative embodiments.

FIG. 3 is an example IIR histogram 300 having a horizontal axis of angle α and a vertical axis of detection points (or more simply "detections"). In this example, line 302 shows the number of detections for different values of a. Cross-hatched region 304 shows a peak number of detection points occurring at around −45 degrees, indicating the presence of a static object, while cross-hatched region 306 shows a peak number of detection points occurring at around 0 degrees, indicating the detection of a hovering broadside vehicle.

Figure 4:
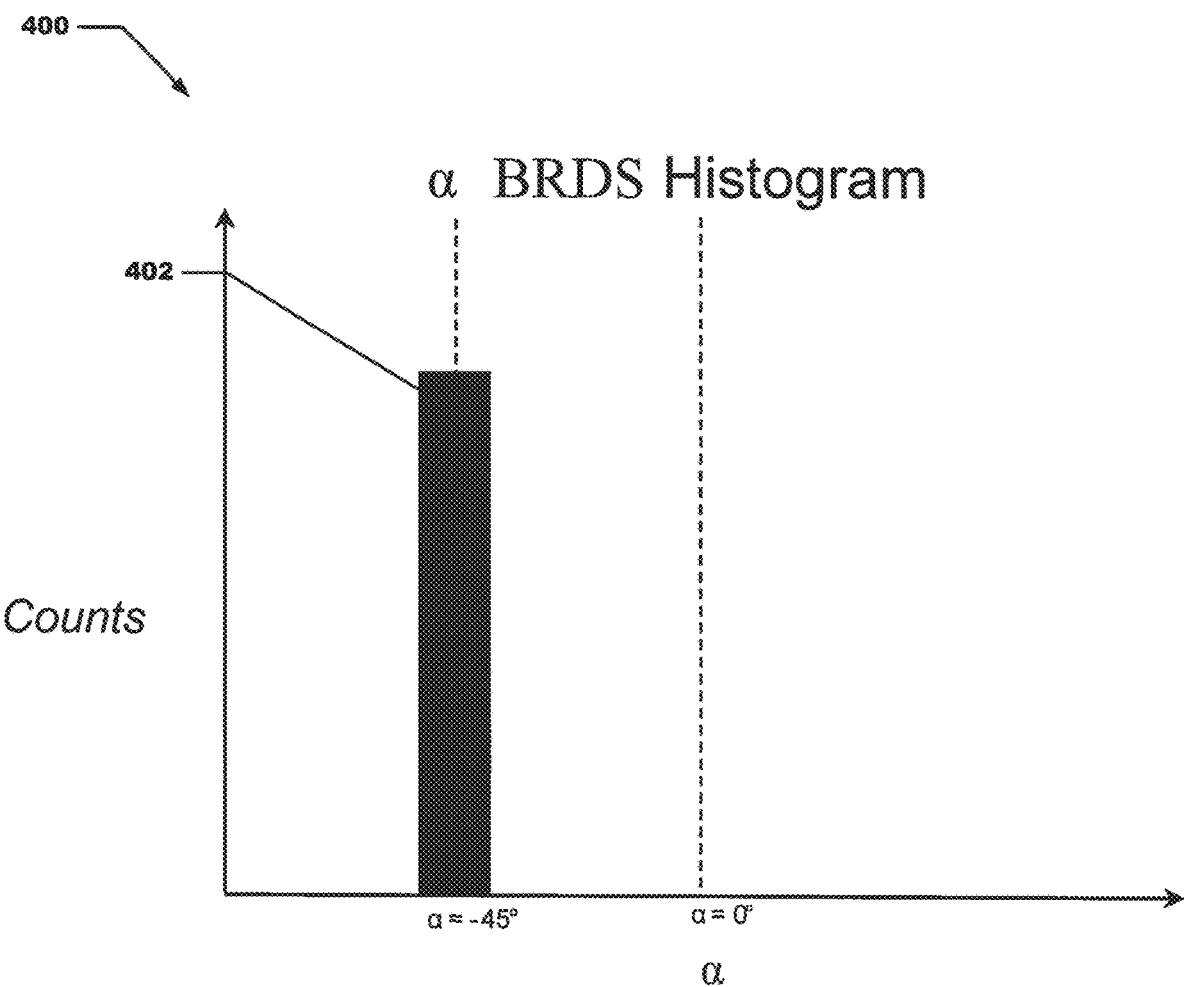
FIG. 4 is a graph showing a histogram of detection counts versus a for a static infrastructure object in accordance with illustrative embodiments.

Referring now to FIG. 4, a histogram 400 similar to histogram 300 of FIG. 3, includes a bar region 402 representing the peak number of a group of detection points at approximately −45 degrees (shown in FIG. 3). Since the detections occur at or near a value of α=−45 degrees, this indicates the presence of a static object.

Figure 5:
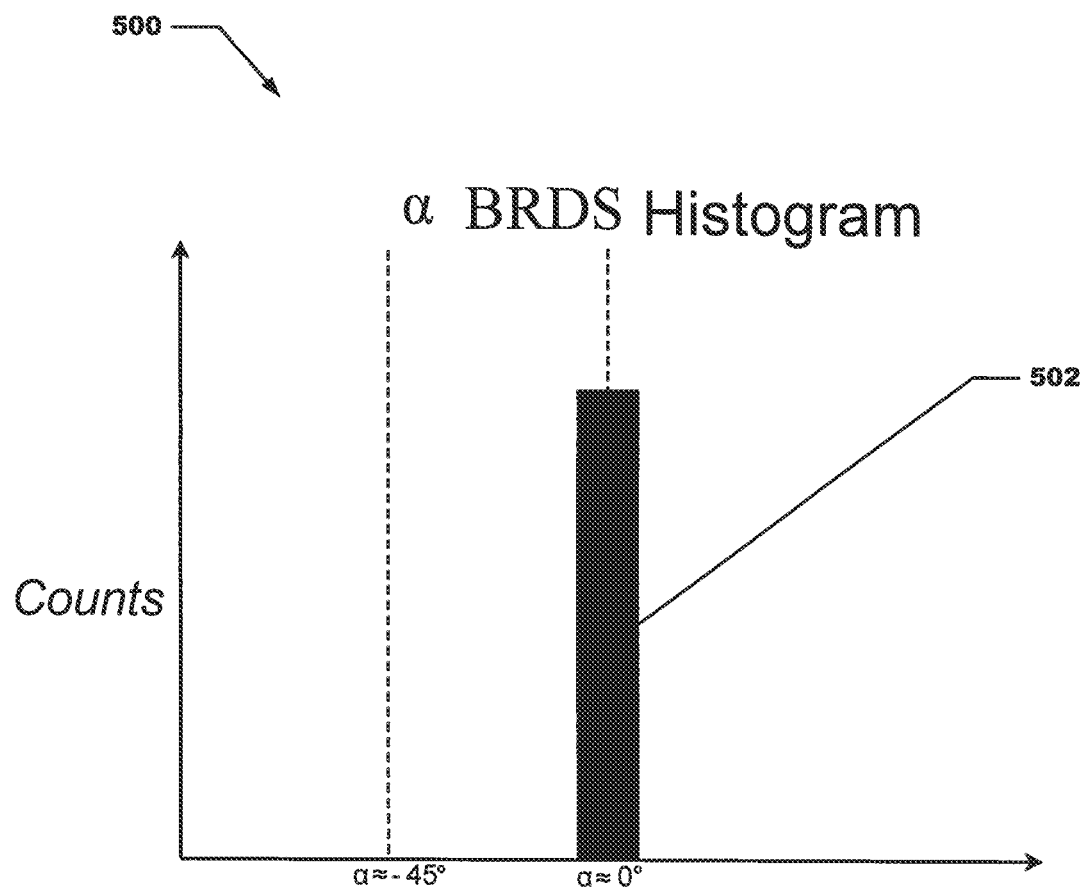
FIG. 5 is a graph showing a histogram of detection counts versus a for a broadside vehicle in accordance with illustrative embodiments.

FIG. 5 shows histogram 500 including a region 502 representing the peak number of a group of detection points at a value of α of approximately 0 degrees. Since the detections occur at or near a value of α=0 degrees, this indicates the presence of hovering vehicle.

It should be appreciated that a set of detection points can include a static object, a hovering broadside vehicle, and even both a static object and a hovering broadside vehicle. For example, in a scenario wherein a hovering broadside vehicle comprises a tractor-trailer, some RF signals emitted from a radar sensor may travel below the body of the tractor-trailer an impinge upon a guardrail or other static infrastructure. Return signals (or echo signals) may be received at the radar sensor and processed to detect the presence of a guardrail or other static infrastructure. In another example, a hovering vehicle may occupy only a section of a radar sensor field of view and be detected by the radar sensor and the same sensor may also detect objects (e.g. static object) in its field of view not occupied by the hovering vehicle.

Image processing and histogram processes are available for detecting the presence of a hovering broadside vehicle and/or a static object. While the present description focuses on histogram processing, it should be noted that image processing may also be used to determine presence of a static infrastructure object and/or a hovering broadside vehicle.

Figure 6:
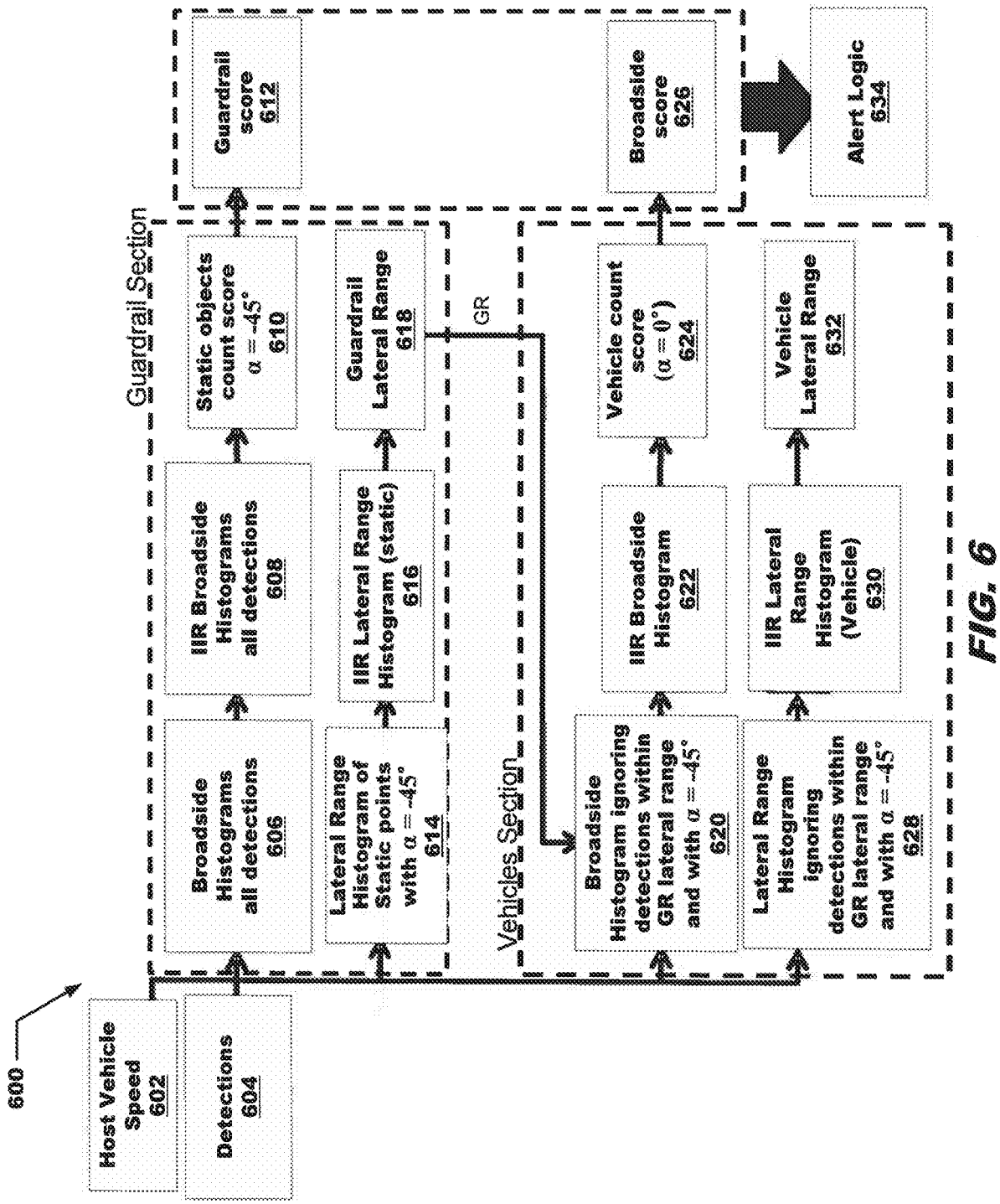
FIG. 6 is a flow diagram of a broadside process data flow in accordance with illustrative embodiments.
Figure 7:
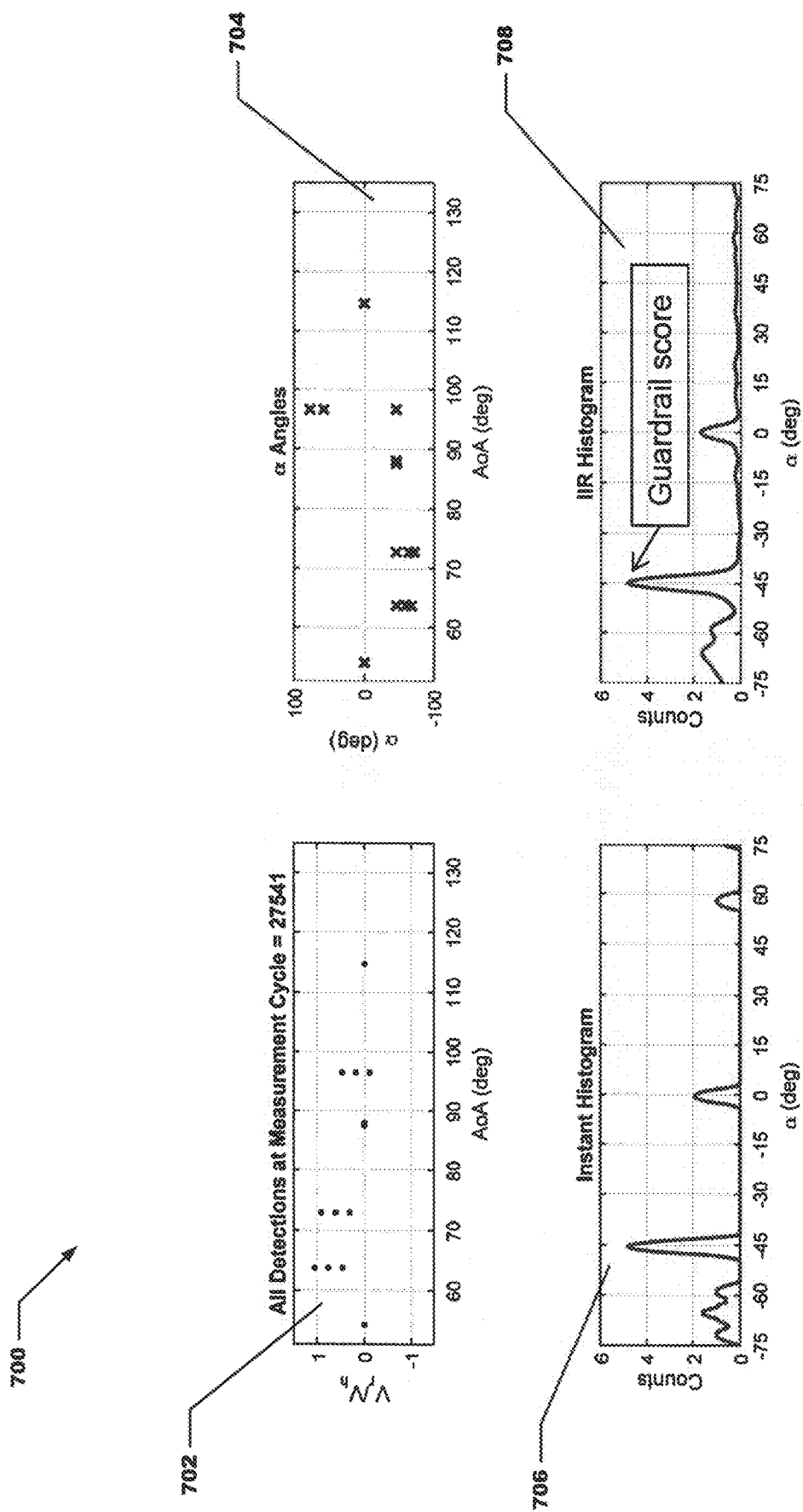
FIG. 7 is a set of graphs showing detection data, a angles, an instant histogram and an IIR histogram for static infrastructure objects in accordance with illustrative embodiments.
Figure 8:
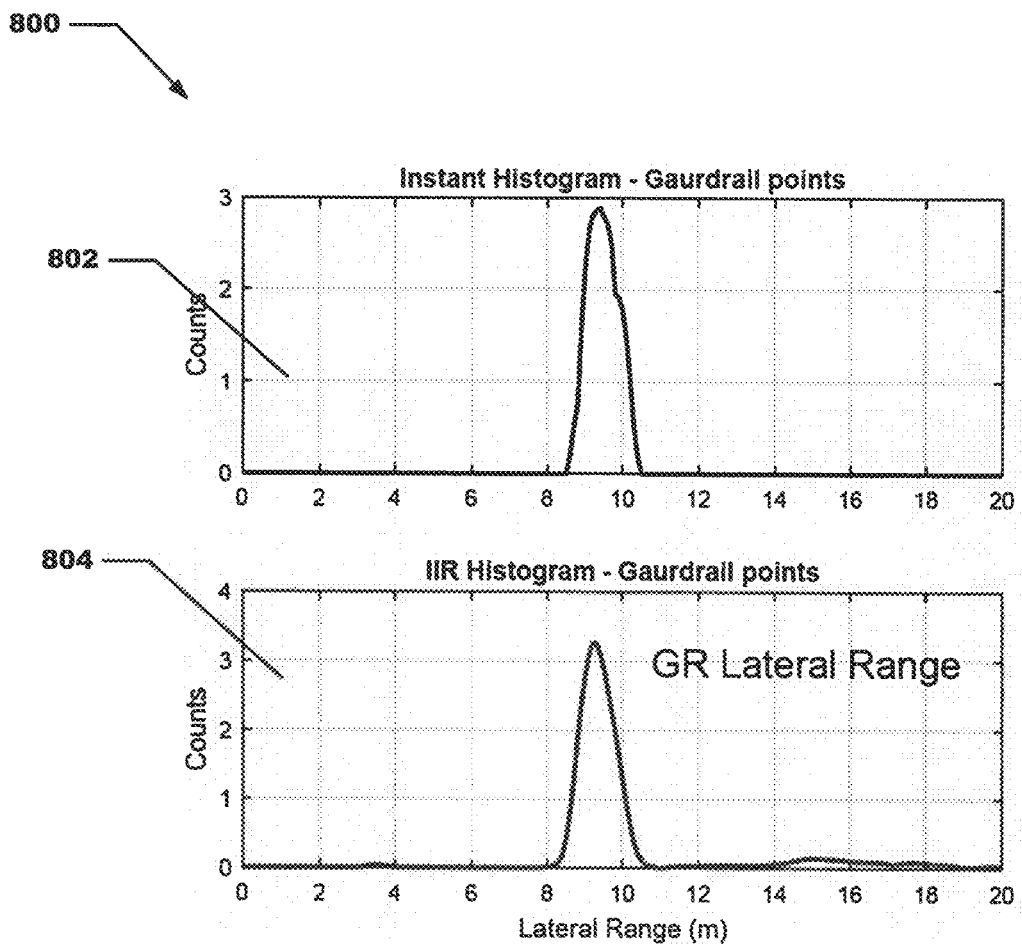
FIG. 8 is a set of graphs showing a lateral range of static infrastructure objects in accordance with illustrative embodiments.
Figure 9:
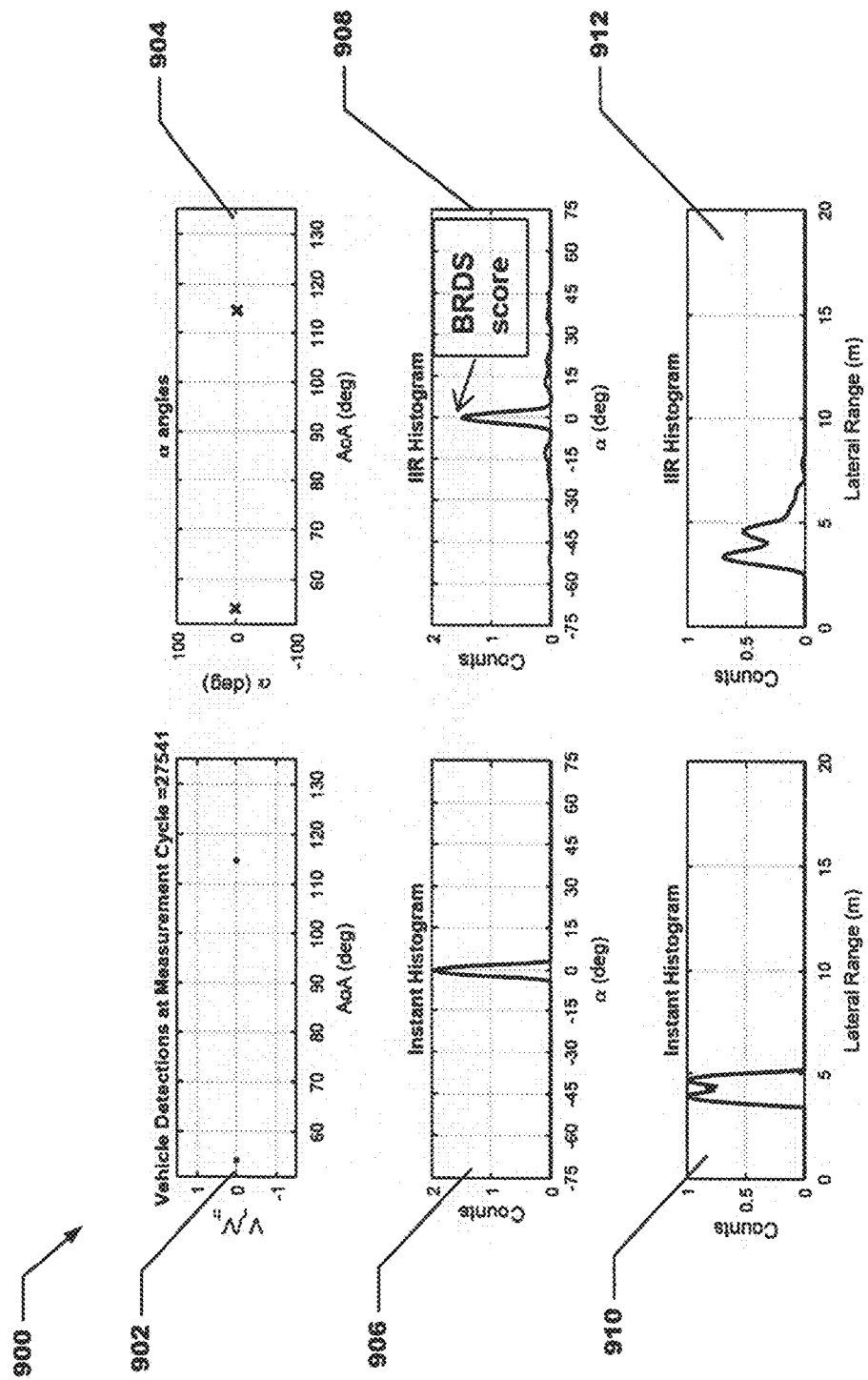
FIG. 9 is a set of graphs showing detection data, a angles, an instant histogram and an IIR histogram for broadside vehicles and a lateral range of broadside vehicles in accordance with illustrative embodiments.

Referring to FIG. 6 in conjunction with FIGS. 7, 8 and 9, an example process flow 600 of one embodiment is shown. As indicated by blocks 602, 604 the system receives the host vehicle speed (e.g. from a vehicle speedometer) while the radar sensor disposed on the host vehicle makes detections. It should be noted that in the diagram of FIG. 6 all the measurements and determinations are made with respect to the host vehicle. Processing block 604 depicts a collection of detection points from the radar sensor. These may include static infrastructure detection points, hovering broadside vehicle detection points or a combination of static infrastructure detection points and hovering broadside vehicle detection points. Such detections may be represented as shown in the graph (or plot) 702 in FIG. 7. Graph 704 shows the associated α angles for each detection point.

As shown in processing block 606 broadside histograms are formed using detections within the FOV of about 45 degrees to 135 degrees. One such broadside histogram is shown in graph 706 (FIG. 7). Graph 706 is produced from the detection points and α angles depicted in graphs 702 and 704. The histogram 706 includes detections for a broadside hovering vehicle, or a static infrastructure, or both.

Averaging the histogram 706 using an IIR technique improves the signal to noise ratio and allows the clutter ridge to build up over time. The time constant of IIR averaging will be balanced between accuracy and response time. The IIR broadside histogram is formed using histogram 706 as shown in processing block 608 and as depicted in graph 708 (FIG. 7). From the IIR histogram, as shown in processing block 610, a static objects count (i.e. a count of detections of static objects) can be determined at angle α, −45 degrees to obtain a so-called guardrail score. In the example of FIG. 6, the guardrail score is computed or otherwise determined with the angle α approximately equal to −45 degrees. This leads to a guardrail score as shown in block 612. When the guardrail score exceeds a predetermined threshold, alert logic may be triggered, as shown by processing block 634.

Processing block 614 starts the process of determining a lateral range of a static object. The lateral range comprises a distance between the host vehicle and the static object. As shown in processing block 614, a lateral range histogram of static points having an angle α of approximately −45 degrees is generated. This is shown in graph 802 of FIG. 8.

In processing block 616, the data of block 614 is averaged over time using IIR technique and an IIR lateral range histogram is generated from the lateral range histogram. The IIR histogram is shown as graph 804 in FIG. 8.

Processing them proceeds to block 618 where a guardrail lateral range is determined. This guardrail lateral range is the distance from the static infrastructure object to the host vehicle.

Beginning now with processing block 620 an example process for detection of a hovering broadside vehicles is presented, wherein the lateral range of the static infrastructure object is taken into account to filter the detection data and result in less processing. As noted above, a broadside vehicle is a vehicle traveling substantially adjacent to and at a similar speed and direction as a host vehicle. Processing block 620 discloses generating a broadside histogram. This generation of a histogram takes into account the static infrastructure object lateral range determined in processing block 618. This shown in graph 902 of FIG. 9. Graph 904 shows the α angles for the detections. Note that in each graph, any detections with a lateral range greater than the guardrail lateral range from processing block 618 and having an α of approximately −45 degrees are ignored. Since less data is being processed and the data which is being processed is more relevant to the information sought to be determined, this makes processing faster, easier and results in a more accurate determination.

Processing block 622 shows producing an IIR broadside histogram as depicted in graph 908. From the IIR histogram, as shown in processing block 624, a vehicle count can be determined at α approximately equal to zero degrees to obtain a broadside score. This leads to the broadside score as shown in block 626. When the broadside score exceeds a predetermined threshold, alert logic may be triggered, as shown by processing block 634.

Processing block 628 starts the process of determining a lateral range of a broadside object. Lateral range is a distance between the host vehicle and the broadside vehicle. As shown in processing block 628, a lateral range histogram is generated. This histogram is generated ignoring detections that are greater than or equal to the guardrail lateral range and also ignoring points having an associated α approximately equal to −45 degrees and is depicted as graph 910 as shown in FIG. 9. Processing block 630 discloses that an IIR lateral range histogram is generated from the lateral range histogram. The IIR histogram is shown in graph 912 in FIG. 9. As shown in processing block 632 and broadside vehicle lateral range is determined. This broadside lateral range is the distance from the broadside vehicle to the host vehicle.

Figure 10:
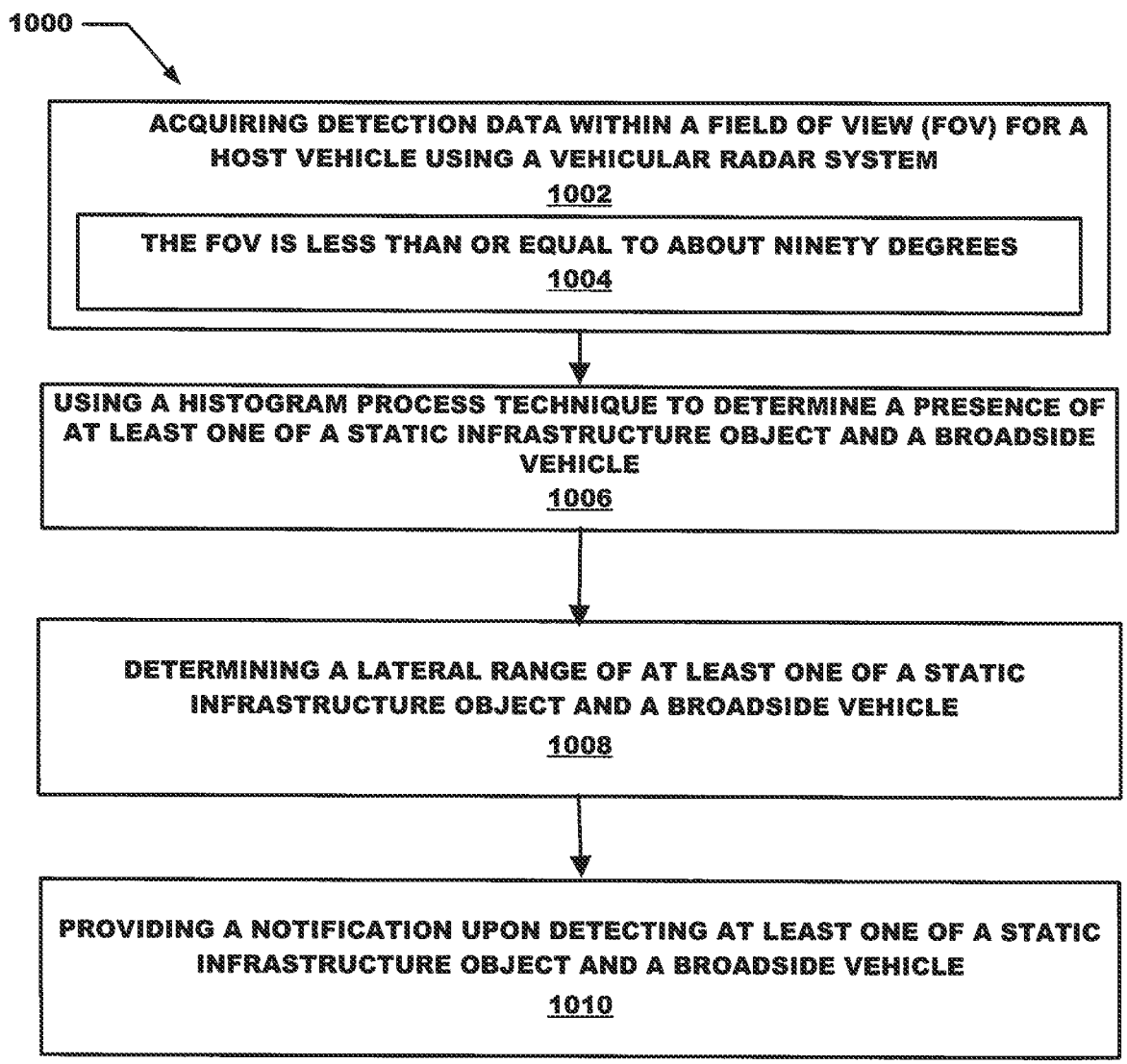
FIG. 10 is a flow diagram of a particular method for detecting static infrastructure objects and broadside vehicles in accordance with illustrative embodiments.
Figure 11:
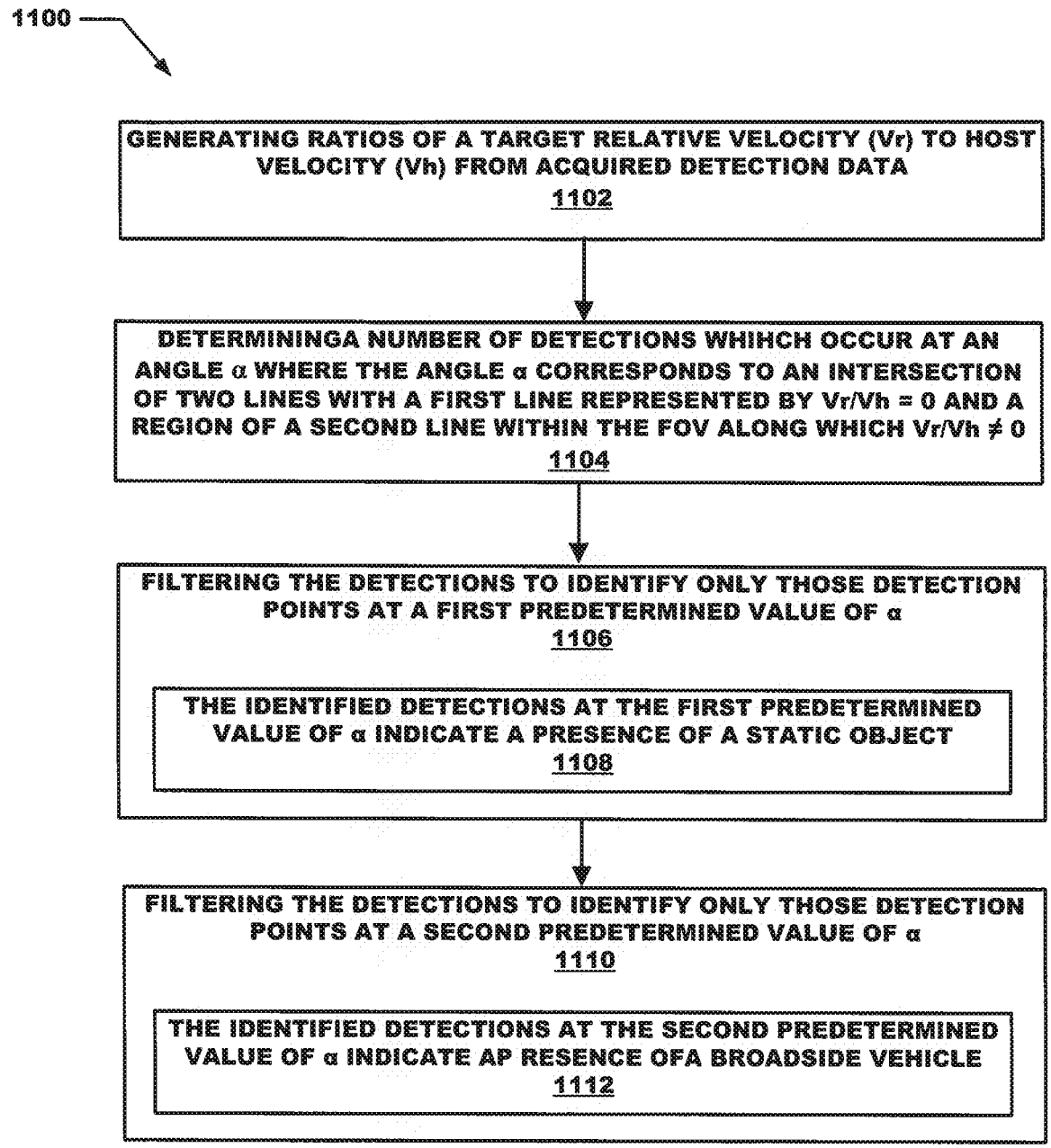
FIG. 11 is a flow diagram of a particular method of a histogram process for detecting static infrastructure objects and broadside vehicles in accordance with illustrative embodiments.
Figure 12:
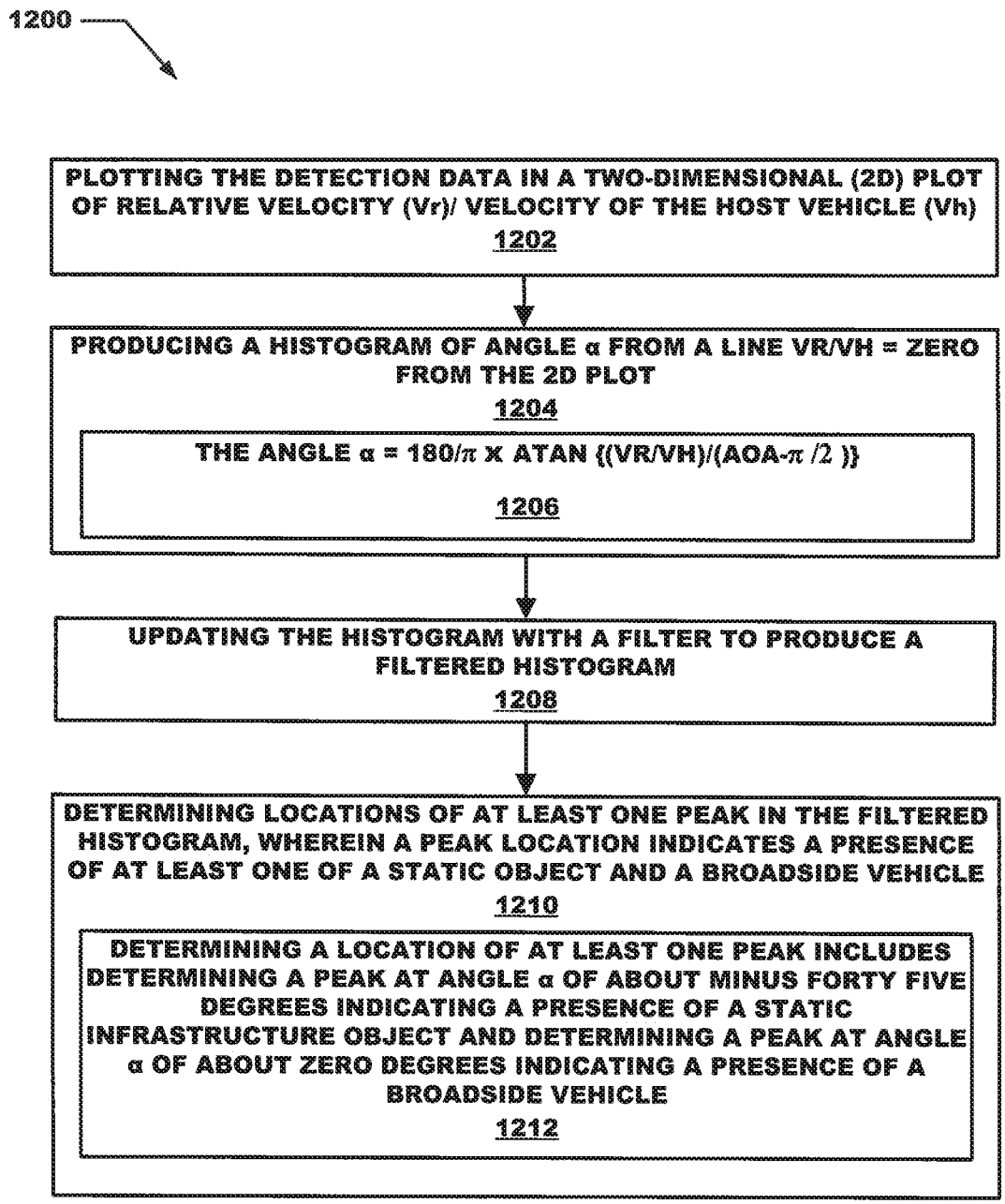
FIG. 12 is a flow diagram of a particular method of a histogram process for detecting static infrastructure objects and broadside vehicles in accordance with illustrative embodiments.

FIGS. 10 to 12 are flow diagrams showing illustrative processing for particular embodiments for detecting static infrastructure objects and hovering broadside objects using a vehicular radar system. Rectangular elements herein denoted "processing blocks," and represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring now to FIG. 10, an embodiment of a method 1000 for detecting static infrastructure objects and broadside objects using a vehicular radar system begins with processing block 1002 which discloses acquiring detection data within a field of view (FOV) for a host vehicle using a vehicular radar system. As further recited in processing block 1004, the FOV of the vehicular radar system in this example is equal to or less than about ninety degrees.

Processing block 1006 shows using a histogram processing technique to determine a presence of at least one of a static infrastructure object and a hovering broadside vehicle. Particular embodiments of the histogram processing techniques are described below with respect to FIG. 11 and FIG. 12.

Processing continues with processing block 1008 which discloses determining a lateral range of at least one of a static infrastructure object and a broadside vehicle. Processing block 1010 shows providing a notification upon detecting at least one of a static infrastructure object and a broadside vehicle.

FIG. 11 shows a particular embodiment of a histogram processing method 1100. Processing block 1102 discloses generating ratios of Vr to Vh from acquired detection data. Processing block 1104 shows determining a number of detections which occur at an angle α where the angle α corresponds to an intersection of two lines with a first line represented by Vr/Vh=0 and a region of a second line within the FOV along which Vr/Vh≠0.

Processing block 1106 recites filtering the detections to identify only those detection points at a first predetermined value of α. As shown in processing block 1108, the identified detections at the first predetermined value of α indicate a presence of a static object.

Processing block 1110 discloses wherein the process includes filtering the detections to identify only those detections at a second predetermined value of α. As further shown in processing block 1112, the identified detections at the second predetermined value of α indicate a presence of a broadside vehicle.

FIG. 12 shows another particular embodiment of a histogram processing method 1200. Method 1200 begins with processing block 1202 which discloses plotting the detection data in a two-dimensional (2D) plot of Vr/Vh.

Processing block 1204 discloses producing a histogram of angle α from a line Vr/Vh=zero from the 2D plot. As shown in processing block 1206 the angle α=180/π×a tan {(Vr/Vh)/(AoA−π/2)}.

Processing block 1208 shows updating the histogram with a filter to produce a filtered histogram. Processing block 1210 recites determining locations of at least one peak in the filtered histogram, wherein a peak location indicates a presence of at least one of a static infrastructure object and a broadside vehicle. Processing block 1212 shows determining a location of at least one peak includes determining a peak at angle α of about minus forty five degrees indicating a presence of a static infrastructure object and determining a peak at angle α of about zero degrees indicating a presence of a broadside vehicle.

Figure 13:
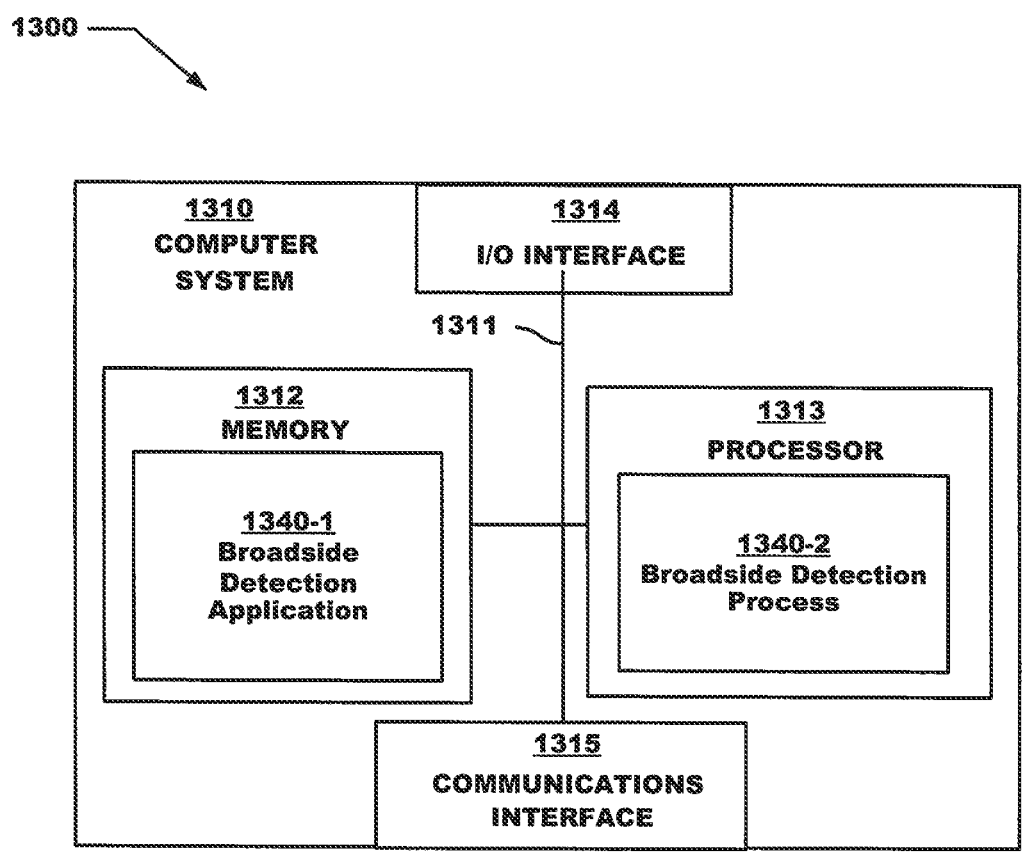
FIG. 13 is a block diagram of a computer system for detecting static infrastructure objects and broadside vehicles in accordance with illustrative embodiments.

FIG. 13 is a block diagram illustrating example architecture of a computer system 1310 that executes, runs, interprets, operates or otherwise performs broadside detection operating application 1340-1 and broadside detection operating process 1340-2 suitable for use in explaining example configurations disclosed herein. The computer system 1310 may be any type of computerized device such as a personal computer, workstation, portable computing device, console, laptop, network terminal or the like. As shown in this example, the computer system 1310 includes an interconnection mechanism 1311 such as a data bus or other circuitry that couples a memory system 1312, a processor 1313, an input/output interface 1314, and a communications interface 1315. The communications interface 1315 enables the computer system 1310 to communicate with other devices (i.e., other computers) on a network (not shown).

The memory system 1312 is any type of computer readable medium, and in this example, is encoded with broadside detection operating application 1340-1 as explained herein. The broadside detection operating application 1340-1 may be embodied as software code such as data and/or logic instructions (e.g., code stored in the memory or on another computer readable medium such as a removable disk) that supports processing functionality according to different embodiments described herein. During operation of the computer system 1310, the processor 1313 accesses the memory system 1312 via the interconnect 1311 in order to launch, run, execute, interpret or otherwise perform the logic instructions of broadside detection operating application 1340-1. Execution of broadside detection operating application 1340-1 in this manner produces processing functionality in the broadside detection operating process 1340-2. In other words, the broadside detection operating process 1340-2 represents one or more portions or runtime instances of broadside detection operating application 1340-1 (or the entire broadside detection operating application 1340-1) performing or executing within or upon the processor 1313 in the computerized device 1310 at runtime.

It is noted that example configurations disclosed herein include the broadside detection operating application 1340-1 itself (i.e., in the form of un-executed or non-performing logic instructions and/or data). The broadside detection operating application 1340-1 may be stored on a computer readable medium (such as a floppy disk), hard disk, electronic, magnetic, optical, or another computer readable medium. Broadside detection operating application 1340-1 may also be stored in a memory system 1312 such as in firmware, read only memory (ROM), or, as in this example, as executable code in, for example, Random Access Memory (RAM). In addition to these embodiments, it should also be noted that other embodiments herein include the execution of broadside detection operating application 1340-1 in the processor 1313 as the broadside detection operating process 1340-2. Those skilled in the art will understand that the computer system 1310 may include other processes and/or software and hardware components, such as an operating system not shown in this example.

During operation, processor 1313 of computer system 1300 accesses memory system 1312 via the interconnect 1311 in order to launch, run, execute, interpret or otherwise perform the logic instructions of the broadside detection application 1340-1. Execution of broadside detection application 1340-1 produces processing functionality in broadside detection process 1340-2. In other words, the broadside detection process 1340-2 represents one or more portions of the broadside detection application 1340-1 (or the entire application) performing within or upon the processor 1313 in the computer system 1300.

It should be noted that, in addition to the broadside detection process 1340-2, embodiments herein include the broadside detection application 1340-1 itself (i.e., the un-executed or non-performing logic instructions and/or data). The broadside detection application 1340-1 can be stored on a computer readable medium such as a floppy disk, hard disk, or optical medium. The broadside detection application 1340-1 can also be stored in a memory type system such as in firmware, read only memory (ROM), or, as in this example, as executable code within the memory system 1312 (e.g., within Random Access Memory or RAM).

In addition to these embodiments, it should also be noted that other embodiments herein include the execution of broadside detection application 1140-1 in processor 1113 as the broadside detection process 1140-2. Those skilled in the art will understand that the computer system 1100 can include other processes and/or software and hardware components, such as an operating system that controls allocation and use of hardware resources associated with the computer system 1100.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method for detecting static objects and broadside objects in a vehicular radar system, the method comprising:
  acquiring detection data within a field of view (FOV) of a host vehicle using the vehicular radar system; and
  using a histogram process to determine a presence of at least one of: a static infrastructure object and a broadside vehicle, wherein using a histogram process comprises:

generating ratios of a relative velocity of an object (Vr) to host velocity (Vh) from the acquired detection data;

plotting said detection data in a two-dimensional (2D) plot of Vr/Vh versus Angle of Arrival (AoA) graph;

producing a histogram of an angle α from a line Vr/Vh=zero from said 2D plot;

updating said histogram with a filter to produce a filtered histogram; and determining locations of at least one peak in said filtered histogram, wherein a peak location indicates a presence of at least one of a static object and a broadside vehicle, wherein determining a location of at least one peak includes determining a peak at angle α of about minus forty-five degrees indicating a presence of a static infrastructure object, and determining a peak at angle α of about zero degrees indicating a presence of a broadside vehicle.

2. The method of claim 1 wherein using said histogram process comprises:

determining a number of detections which occur at an angle α where the angle α corresponds to an intersection of two lines with a first line represented by Vr/Vh=0 and a region of a second line within the FOV along which Vr/Vh≠0.

3. The method of claim 2 further comprising filtering the detections to identify only those detection points at a first predetermined value of α.

4. The method of claim 3 further comprising filtering the detections to identify only those detections at a second predetermined value of α.

5. The method of claim 4 wherein the identified detections at the second predetermined value of α indicate a presence of a broadside vehicle.

6. The method of claim 3 wherein the identified detections at the first predetermined value of α indicate a presence of a static object.

7. The method of claim 1 further comprising providing a notification upon detecting at least one of a static object and a broadside vehicle.

8. The method of claim 1 further comprising determining a lateral range of at least one of a static object and a broadside vehicle.

9. The method of claim 1 wherein said FOV is equal to or less than about ninety degrees.

10. The method of claim 1 wherein the angle α=180/π×a tan {(Vr/Vh)/(AoA−π/2)}.

11. An apparatus comprising:

a transmitter configured to transmit sets of radar pulses;

a receiver for receiving sets of return pulses from an object within a field of view (FOV) of a host vehicle using the apparatus: and a processor to acquire from the receiver a set of range and angle detection data relating to the return pulses; and the processor using a histogram process to determine a presence of at least one of a static object and a broadside vehicle, wherein the processor using said histogram process comprises:

the processor generating ratios of a relative velocity of an object (Vr) to host velocity (Vh) from the acquired detection data;

the processor plotting said detection data in a two-dimensional (2D) plot of Vr/Vh versus AoA graph; and the processor producing a histogram of an angle α from a line Vr/Vh=zero from said 2D plot;

the processor updating said histogram with an averaging technique to produce a time averaged histogram; and the processor determining locations of at least one peak in said averaged histogram, wherein a peak location indicates a presence of at least one of a static object and a broadside vehicle, wherein the processor determining a location of at least one peak includes the processor determining a peak at angle α of about minus forty-five degrees indicating a presence of a static infrastructure object, and the processor determining a peak at angle α of about zero degrees indicating a presence of a broadside vehicle.

12. The apparatus of claim 11 wherein the processor using said histogram process comprises the processor:

determining a number of detections which occur at an angle α where the angle α corresponds to an intersection of two lines with a first line represented by Vr/Vh=0 and a region of a second line within the FOV along which Vr/Vh≠0.

13. The apparatus of claim 12 further comprising the processor filtering the detections to identify only those detection points at a first predetermined value of α.

14. The apparatus of claim 13 further comprising the processor filtering the detections to identify only those detections at a second predetermined value of α.

15. The apparatus of claim 14 wherein the identified detections at the second predetermined value of α indicate a presence of a broadside vehicle.

16. The apparatus of claim 13 wherein the identified detections at the first predetermined value of α indicate a presence of a static object.

17. The apparatus of claim 11 further comprising the processor providing a notification upon detecting at least one of a static object and a broadside vehicle.

18. The apparatus of claim 11 further comprising the processor determining a lateral range of at least one of a static object and a broadside vehicle.

19. The apparatus of claim 11 wherein said FOV is equal to or less than about ninety degrees.

20. The apparatus of claim 11 wherein the angle α=180/π×a tan {(Vr/Vh)/(AoA−π/2)}.

21. A computer program product including a non-transitory computer readable storage medium having computer program code encoded thereon that when executed on a processor of a computer causes the computer to operate a vehicular radar system, the computer program product comprising:

computer program code for acquiring detection data within a field of view (FOV) of a host vehicle using the vehicular radar system; and computer program code for using a histogram process to determine a presence of at least one of: a static infrastructure object and a broadside vehicle, wherein the computer program code for using a histogram process comprises:

computer program code for generating ratios of a relative velocity of an object (Vr) to host velocity (Vh) from the acquired detection data;

computer program code for plotting said detection data in a two-dimensional (2D) plot of Vr/Vh versus Angle of Arrival (AoA) graph;

computer program code for producing a histogram of an angle α from a line Vr/Vh=zero from said 2D plot;

computer program code for updating said histogram with a filter to produce a filtered histogram; and computer program code for determining locations of at least one peak in said filtered histogram, wherein a peak location indicates a presence of at least one of a static object and a broadside vehicle, wherein determining a location of at least one peak includes determining a peak at angle α of about minus forty-five degrees indicating a presence of a static infrastructure object, and determining a peak at angle α of about zero degrees indicating a presence of a broadside vehicle.

22. The computer program product of claim 21 wherein using said computer program code for using a histogram process comprises:
computer program code for determining a number of detections which occur at an angle α where the angle α corresponds to an intersection of two lines with a first line represented by Vr/Vh=0 and a region of a second line within the FOV along which Vr/Vh≠0.

23. The computer program product of claim 22 further comprising computer program code for filtering the detections to identify only those detection points at a first predetermined value of α.

24. The computer program product of claim 23 further comprising computer program code for filtering the detections to identify only those detections at a second predetermined value of α.

25. The computer program product of claim 23 further comprising computer program code wherein the identified detections at the first predetermined value of α indicate a presence of a static object.

26. The computer program product of claim 24 further comprising computer program code wherein the identified detections at the second predetermined value of α indicate a presence of a broadside vehicle.

27. The computer program product of claim 21 further comprising computer program code for providing a notification upon detecting at least one of a static object and a broadside vehicle.

28. The computer program product of claim 21 further comprising further comprising computer program code for determining a lateral range of at least one of a static object and a broadside vehicle.

* * * * *